United States Patent Office 3,567,626
Patented Mar. 2, 1971

3,567,626
PROCESS FOR REDUCING THE SATURATE CONTENT OF AN OIL
Paul P. Bozeman, Jr., Groves, and Billy H. Cummins, Nederland, Tex., assignors to Texaco Inc., New York, N.Y.
No Drawing. Filed Dec. 18, 1968, Ser. No. 784,931
Int. Cl. C10g 21/02
U.S. Cl. 208—316                                      3 Claims

ABSTRACT OF THE DISCLOSURE

A process for preparing aromatic oils with low saturate content, particularly rubber processing oils, by contacting a distillate extract with a hydrocarbon material containing up to 30 volume percent saturates and recovering an aromatic oil of reduced saturate content. The preferred solvent is furfural.

---

This invention relates to a process for reducing the saturate content of an aromatic oil and more particularly to a process whereby the saturate content of an aromatic oil is decreased to a level below 15 volume percent.

Generally speaking, solvent extraction operations are well known in the art. Ordinarily, in one form of operation, a liquid-liquid extraction is accomplished by feeding a material to be extracted, that is, one in which there are present at least two different chemical entitles which have different solubilities or preferences in the presence of each other or a solvent, into a solvent extraction zone in which the material is contacted with a solvent, usually in counter-current flow. At one end of the zone there is removed a raffinate portion or a portion which represents that chemical entity which is not as soluble in the solvent and at the other end an extract phase which contains the other entity.

For many uses, especially in lubrication technology, it is necessary to free distillate oils to a large extent from aromatic compounds, principally in order to improve their viscosity/temperature behavior and also to improve their aging characteristics. This may be carried out by a process of selective solvent extraction, which provides on the one hand products rich in aromatics which are known as extract phases (aromatic oil plus aromatic selective solvent) and on the other hand the extracted oils containing some solvent which are designated raffinate phases.

A large number of solvents have already been proposed or have been used in solvent extraction processes for example phenol, liquid suflur dioxide, nitrobenzene, N-methyl-2-pyrrolidone and furfural. These processes are based on the different solvent capacities of the solvents for the various groups of substances contained in the petroleum fractions. For example, the above mentioned solvents possess a high solvent capacity for aromatics and restricted solvent capacity for the other groups of hydrocarbons. In general, extracts obtained by the selective solvent extraction of distillates or deasphalted residual oils, for example extracts obtained by the solvent extraction of lubricating distillates (e.g. distillate extracts) from naphthenic base crudes, mixed base or paraffinic base crudes usually contain on a solvent free extract basis a major amount by volume of aromatic hydrocarbons and in addition up to 50 volume percent saturates, e.g. saturated compounds such as paraffinic and alicyclic compounds, and such solvent free extracts are hereinafter referred to as aromatic oils.

It is known that the properties of such aromatic oils can be improved by refining techniques such as distillation or hydrogen treatment, for example in order to brighten their color. A particular property that is extremely difficult to alter by these and other processes is the reduction in saturate content of the aromatic oils, which property is of considerable importance in the manufacture of rubber processing oils for example. Thus, to manufacture rubber processing oil it is desirable and under certain specifications mandatory, to maintain the volume percent of saturates at or below 15 volume percent. To arrive at this level, numerous processing steps are necessary, such as distillation and blending of various aromatic rich hydrocarbon materials.

It is an object of this invention to prepare aromatic oils having reduced saturate content and, more particularly, a saturate content below 15 volume percent.

It has now been found that oils having reduced saturate content can be obtained by contacting an extract phase in a solvent extraction process with a hydrocarbon material comprising a major amount by volume of aromatic hydrocarbons and from 1 to 30 volume percent saturates and recovering an aromatic oil of reduced saturate content. More particularly it has been found that the hydrocarbon material can have a saturate content lower or greater than the saturate content of the aromatic oil that is produced by subjecting the extract phase to an extraction process without contacting with such hydrocarbon material.

Thus, the process of this invention comprises contacting an extract phase (preferably a distillate extract phase) comprising an aromatic oil and aromatic selective solvent with a hydrocarbon material comprising a major amount of volume of aromatic hydrocarbons, from 1 to about 30% by volume saturates and from 0 to about 20% by volume aromatic selective solvent in a solvent extraction process the total amount of aromatic selective solvent being sufficient to form a secondary extract and raffinate phase under conditions such as temperature, pressure and concentration of hydrocarbon material which are maintained during the extraction process, separating the secondary extract phase from the secondary raffinate phase and recovering an aromatic oil of lower saturate content than the aromatic oil obtained in a solvent extraction process without contacting with the hydrocarbon material.

In general, it has been found that the volume of hydrocarbon material to aromatic oil present in the extract phase that is a solvent free extract, of from about 0.1 to about 0.5, preferably from about 0.12 to about 0.4 produces the maximum reduction in saturate content of the final aromatic oil. In addition, it has been found that from 2 to about 25 volume percent saturates in the hydrocarbon material and from 0 to 10 volume percent solvent, preferably from 0 to about 1 volume percent solvent produces the most advantageous results, that is, the maximum amount of reduction of percent saturates in the final aromatic oil.

The ratio of aromatic selective solvent (hereinafter referred to as solvent) to solvent free extract, must be sufficient to exceed its solubility under the extraction conditions such as temperature, pressure and concentration of hydrocarbon material in said solvent free extract in order to form two distinct liquid phases, viz., a secondary raffinate phase containing little or no solvent and an immiscible secondary extract phase comprising the solvent and extract hydrocarbons. Thus, the secondary extract and secondary raffinate phases can be formed by (a) exceeding the solubility limits of the solvent in the solvente free extract for a given temperature, (b) reducing the temperature of the extract containing soluble solvent in order to form a secondary raffinate and secondary extract phase, (c) injecting the hydrocarbon material into the extract phase to form a secondary raffinate and secondary extract phase or a combination of, for example, any of the foregoing methods. Generally, about 0.5 to about 20 volumes of solvent per volume of solvent free extract are utilized in the process of this invention, preferably from about 1 to about 10 volumes of solvent per volume of solvent free extract. Sufficient pressure is maintained within the extraction zone to prevent substantial volatilization of the solvent free extract or solvent under the liquid-liquid extraction conditions. Usually pressures within the range of about 0 to about 100 p.s.i. are sufficient, it being appreciated that the particular pressure which is required in a given case can readily be determined by experiment. The process of this invention can be conducted at temperatures between about 85° F. and about 160° F., depending upon the particular charging stock, the particular solvent or solvents, the solvent: feed ratio, the number of extraction stages, the degree of extraction which is sought, the proportions of auxiliary solvents (if any). In general, however, the process of this invention is conducted at temperatures between about 100° F. to about 140° F.

A particularly preferred embodiment of this invention comprises the contacting of an extract phase containing from ½ to about 20 volumes of solvent per volume of solvent-free extract especially the distillate extract phase obtained from a solvent extraction of a lubricating oil at a temperature of from about 160° F. to about 250° F. hereinafter referred to as a primary distillate extract, with a hydrocarbon material, containing less than 1% solvent at a ratio of volume of hydrocarbon material to volume of solvent free extract of up to about 0.5:1, and reducing the temperature to below 160° F. to form secondary extract and raffinate phases. The secondary extract phase is then separated from the secondary raffinate phase and an aromatic oil recovered after stripping of solvent which has a percent saturates below about 15 volume percent.

An additional preferred embodiment of this invention comprises reducing the temperature as set forth above of the primary extract to below 160° F., to form a secondary raffinate and secondary extract phase, separating the secondary extract from the secondary raffinate phase and contacting the separated secondary extract phase with the hydrocarbon material to form a third raffinate and extract phase. Upon separation of the third extract phase and removal of solvent, an aromatic oil is obtained with reduced saturate content below 15 volume percent. The preferred source of the hydrocarbon material is the material obtained from the above preferred processes e.g., this hydrocarbon material is added to the primary extract phase with continuous recycle of said hydrocarbon material.

Although distillate extracts from the extraction of different types of lube crude fractions are suitable in the practice of the invention, extract solutions resulting from the extraction of lube fractions to give high viscosity index (at least about 85) raffinates are particularly useful.

Various lubricating oil extract solutions are suitable as extracting agent for the practice of the invention. Particularly suitable extract solutions are those obtained by extracting lubricating oil distillate to produce lubricating oil raffinates having a viscosity of at least about 200 SUS at 100° F., such as so-called 200, 250, 380 and heavy distillates. Expressed another way, the extract should comprise hydrocarbons having a molecular weight of at least about 300, preferably ranging from about 350 to about 500. However, extract solutions obtained in the production of so-called bright stock, by the solvent extraction of short residues, generally after deasphalting, where the molecular weights are of the order of 600 to 800, are suitable also, e.g. (bright stock extract phases).

The hydrocarbon material which is utilized in the process of this invention in general contains up to 30 percent by volume saturates and up to 20 percent by volume solvent with the remainder usually in at least a major amount by volume being aromatic compounds. Thus, the hydrocarbon material can be a solvent free distillate extract as set forth above but within the hydrocarbon material limits as to percent saturates and to percent solvent. By the term "saturate" is meant those compounds which are saturated and which are found in distillate extracts such as paraffinic, and alicyclic materials. The hydrocarbon material therefore can be a solvent distillate extract (e.g. stripped extract) which is obtained from a solvent extraction process to produce lubricating oils. As stated above a particular preferred embodiment of this invention is to utilize the hydrocarbon material which is obtained after stripping of solvent from a secondary extract formed by the cooling of the primary distillate extract followed by the recycle of this hydrocarbon material to the primary distillate extract.

The practice of this invention is broadly applicable to any liquid-liquid solvent extraction process wherein two separate liquid phases are flowed countercurrently with respect to each other. Accordingly, this invention is suitable not only for those liquid-liquid countercurrent solvent extraction operations employing one selective solvent in contact with a liquid mixture to be fractionated but is also applicable to the so-called "Duo Sol" solvent extraction process wherein the liquid mixture to be separated is introduced at some intermediate point of the extraction zone wherein two immiscible solvents of different densities are flowing countercurrently. Selective solvent which may be used in the practice of this invention may be more dense or less dense than the solvent free distillate extract to be separated and may comprise such well-known selective solvents (e.g. principal solvents) such as nitrobenzene, liquid propane and sulfur dioxide, B,B'-dichloroethyl ether (Chlorex), phenols (Selecto), furfural, N-methyl-2-pyrrolidone, liquid hydrogen fluoride and the various other well-known organic and inorganic selective solvents, the preferred solvents being furfural and N-methyl-2-pyrrolidone. In addition, it may be desirable to employ diluents, auxiliary solvents or antisolvents in specific cases in order to modify selectively of the principal solvent, to lower the melting point of the principal solvent to permit its use at low temperatures or for other reasons. The amount of auxiliary solvent can be selected with reference to specific cases; ordinarily, between about 1 and about 20 weight percent or even more, based on the principal solvent, may be employed. The auxiliary solvent should be miscible to the desired extent with the principal solvent, and should preferably be a neutral compound. As examples of auxiliary solvents which can be employed are water, the sulfolanes, examples of which are 2,e-dimethylsulfolane, 2,3-dimethylsulfolane and the like; various nitriles such as acetonitrile, bis-2-cyanoethyl ether and the like; various ethers such as diethyl ether, methyl-tert-butyl ether; glycols or their ethers, tetrahydrofuran and the like; halogenated hydrocarbon solvents such as chloroform, carbon tetrachloride, ethyl dichloride, trichloroethane, tetrachloroethane and the like; esters of carbonic acid, monocarboxylic acids and dicarboxylic acids, for instance, diethyl carbonate, bis-2-hydroxyethyl carbonate, bis-2-chloroethyl carbonate, bis-2-methoxyethyl carbonate, ethylene carbonate, n-butyl formate, methyl furoate, dimethyl oxalate, diethyl succinate, dimethyl phthalate, dimethyl isophthalate, and the like; and ketones, for example, methyl ethyl ketone, methyl isobutyl ketone and the like.

In the extraction, a small proportion of a suitable surface-active agent may be added to increase the efficiency of the extraction equipment. Thus, long chain esters of perfluoroalkyl alcohols or perfluoroalkyl acids, perfluoroalkyl-amides and amines, etc. may be employed, in suitable concentrations between about 0.001 and about 1 weight percent, based on the weight of the solvent.

Any means of separating extracted materials from the extract phase and of recovering solvent therefrom may be employed. Thus, in most cases, it is desirable to distill extracted materials from the extract phase with or without the aid of a stripping gas such as nitrogen, carbon dioxide etc. Also, the solvents may in some instances be recovered from the extract layer by crystallization or by washing with a solvent which is highly selective therefor, such as ethers, etc.

The present invention can be carried out in batch, continuous or semi-continuous operating cycles, and in one or more actual or theoretical stages, employing contacting and separation equipment such as has heretofore been employed in the selective solvent refining of petroleum stocks. Various types of liquid-liquid extraction operations and suitable extraction equipment are described, for example, in "Chemical Engineers' Handbook" (McGraw-Hill Publishing Co., Inc., New York, 1950), pp. 716 ff. and 474 ff. It should be understood that the specific equipment employed forms no part of the present invention and that any equipment adaptable for the purpose of contacting the solvent with the hydrocarbon charging stock and thereafter separating an extract phase from the refined charging stock can be employed for the purpose of my invention.

The process of this invention can be better appreciated by the following non-limiting examples.

EXAMPLE 1

To a separator equipped with stirring means is added 24 gallons of a lubricating oil extract containing 13 volume percent solvent free oil which contains 20 vol. percent saturates and 87% furfural solvent by volume and 2,271 milliliters of a hydrocarbon material containing less than 1% furfural solvent, 22.1 volume percent saturates with the remainder aromatic hydrocarbons. The mixture is mixed over a 15 minute period during which the temperature of the mix is adjusted to 130° F. While settling, the mixture forms two phases and after a 30 minute period an extract phase is withdrawn (23.0 gallons). After removal of the solvent from the extract phase, the aromatic oil has a saturate content of 9.6 volume percent.

EXAMPLE 2

To a separator is added 23.5 gallons of a lubricating oil extract containing 13 volume percent solvent free oil which contains 20 volume percent saturates and 87 volume percent furfural. To this extract is added 4,447 milliliters of a hydrocarbon material containing less than 1% furfural, 22.1 percent saturates with the remainder being aromatic hydrocarbons. The temperature of the mixture is adjusted with agitation to 130° F. During a subsequent settling period, the mixture forms two phases and after 30 minutes, the extract phase is separated from the raffinate phase and after stripping of the furfural solvent from the extract phase the aromatic oil has a percent saturates of 9.9 volume percent.

EXAMPLE 3

To a separator is added 22 gallons of a lubricating oil extract containing 13 volume percent oil which contain 20 volume percent saturates and 87 volume percent furfural. To this extract is added 2310 milliliters of a hydrocarbon material containing less than 1% furfural, 7.8 vol. percent saturates with the remainder being aromatic hydrocarbons. The temperature of the mixture is adjusted with agitation to 130° F. after which the mixture forms two phases while settling. After a 30 minute period, the extract phase is separated from the raffinate phase and after stripping of the furfural solvent from the extract phase the aromatic oil has a percent saturates of 8.5 volume percent.

EXAMPLE 4

To a separator is added 23.5 gallons of a lubricating oil extract at a temperature of 160° F. containing 13 volume percent oil which contain 20 vol. percent saturates and 87 volume percent furfural. The temperature is reduced to 130° F. with agitation. After the two phases are formed over a period of 30 minutes, the extract phase is withdrawn (22.0 gallons). After removal of the furfural solvent from the extract phase an aromatic oil is obtained which has a percent saturates of 11.3 volume percent.

Example 1 through 4 clearly demonstrate the outstanding performance of the process of this invention for reducing the saturate content of an aromatic oil. More particularly, Examples 1 and 2 demonstrate that a reduction in saturate content of an aromatic oil can be obtained even though the hydrocarbon material which is combined with the extract phase has a percent saturate content higher than the percent saturate content which is obtained by subjecting the extract phase to an extraction process such as set forth in Example 4.

While this invention has been described with respect to various specific examples and embodiments, it is to be understood that the invention is not limited thereto and that it can be variously practiced within the scope of the various claims.

We claim:

1. A solvent extraction process for reducing the saturate content of an aromatic oil which comprises contacting an extract phase comprising an aromatic selective solvent and an aromatic oil member selected from the group consisting of lubricating oil extract and bright stock extract with a hydrocarbon material, said hydrocarbon material containing from about 2 to 25% by volume saturate, from about 0 to 1% volume of an aromatic selective solvent and the remainder amount of said hydrocarbon volume being aromatic hydrocarbon utilizing a ratio of volume of hydrocarbon material to volume of said aromatic oil member of from about 0.1 to about 0.4, the total amount of aromatic selective solvent being sufficient to form a secondary extract phase and a secondary raffinate phase under extraction conditions of temperature, pressure and concentration of hydrocarbon material, separating the secondary extract phase from the secondary raffinate phase and recovering an aromatic oil of reduced saturate content from the secondary exact prhase, said hydrocarbon material contacting said extract phase at a temperature from about 160 to about 250° F. and the temperature during the formation of the secondary extract and raffinate phases being from about 85 to about 160° F.

2. A process in accordance with claim 1 wherein said aromatic oil member is a lubricating oil extract and said aromatic selective solvent is furfural.

3. A process in accordance with claim 1 wherein said aromatic oil member is bright stock extract and said aromatic solvent is furfural.

References Cited

UNITED STATES PATENTS

| | | | |
|---|---|---|---|
| 2,201,549 | 5/1940 | Van Dijk | 208—317 |
| 2,201,550 | 5/1940 | Van Dijk et al. | 208—317 |
| 2,270,827 | 1/1942 | Tijmstra | 208—317 |
| 2,886,523 | 5/1959 | Claridge et al. | 208—314 |
| 3,072,568 | 1/1963 | Norton | 208—314 |
| 3,317,422 | 5/1967 | Benham | 208—314 |

HERBERT LEVINE, Primary Examiner

U.S. Cl. X.R.

208—317, 323, 327